US011151379B2

(12) United States Patent
Freitag et al.

(10) Patent No.: US 11,151,379 B2
(45) Date of Patent: Oct. 19, 2021

(54) METHOD AND SYSTEM FOR CROP TYPE IDENTIFICATION USING SATELLITE OBSERVATION AND WEATHER DATA

(71) Applicant: INTERNATIONAL BUSINESS MACHINES CORPORATION, Armonk, NY (US)

(72) Inventors: Marcus O. Freitag, Pleasantville, NY (US); Hendrik F. Hamann, Yorktown Heights, NY (US); Levente Klein, Tuckahoe, NY (US); Siyuan Lu, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 109 days.

(21) Appl. No.: 16/571,643

(22) Filed: Sep. 16, 2019

(65) Prior Publication Data
US 2020/0012853 A1 Jan. 9, 2020

Related U.S. Application Data

(63) Continuation of application No. 15/395,613, filed on Dec. 30, 2016, now Pat. No. 10,586,105.

(51) Int. Cl.
*G06K 9/00* (2006.01)
*G06K 9/62* (2006.01)
(Continued)

(52) U.S. Cl.
CPC ......... *G06K 9/00657* (2013.01); *A01G 22/00* (2018.02); *G06K 9/6256* (2013.01);
(Continued)

(58) Field of Classification Search
None
See application file for complete search history.

(56) References Cited

U.S. PATENT DOCUMENTS

| 7,702,597 B2 | 4/2010 | Singh et al. |
| 7,916,898 B2 | 3/2011 | Anderson |

(Continued)

FOREIGN PATENT DOCUMENTS

WO 2018010471 A1 1/2018

OTHER PUBLICATIONS

Woebbecke, David M., et al. "Plant species identification, size, and enumeration using machine vision techniques on near-binary images." Optics in Agriculture and Forestry. vol. 1836. International Society for Optics and Photonics, 1993. (Year: 1993).*

(Continued)

*Primary Examiner* — Michelle M Entezari
(74) *Attorney, Agent, or Firm* — Tutunjian & Bitetto, P.C.; Randall Bluestone

(57) ABSTRACT

A computer-implemented method for crop type identification using satellite observation and weather data. The method includes extracting current and historical data from pixels of satellite images of a target region, generating temporal sequences of vegetation indices, based on the weather data, converting each timestamp of the temporal sequences into a modified temporal variable correlating with actual crop growth, training a classifier using a set of historical temporal sequences of vegetation indices with respect to the modified temporal variable as training features and corresponding historically known crop types as training labels, identifying a crop type for each pixel location within the satellite images using the trained classifier and the historical temporal sequences of vegetation indices with respect to the modified temporal variable for a current crop season, and estimating a crop acreage value by aggregating identified pixels associated with the crop type.

20 Claims, 7 Drawing Sheets

(51) Int. Cl.
   *A01G 22/00* (2018.01)
   *G06N 20/00* (2019.01)
   *G06T 7/00* (2017.01)
(52) U.S. Cl.
   CPC ........... *G06N 20/00* (2019.01); *G06T 7/0016* (2013.01); *G06K 2209/17* (2013.01); *G06T 2207/10024* (2013.01); *G06T 2207/10032* (2013.01); *G06T 2207/20081* (2013.01); *G06T 2207/20084* (2013.01); *G06T 2207/30188* (2013.01)

(56) References Cited

U.S. PATENT DOCUMENTS

| | | | |
|---|---|---|---|
| 9,202,252 | B1 | 1/2015 | Smith et al. |
| 9,058,633 | B2 | 6/2015 | Lindores et al. |
| 9,131,644 | B2 | 9/2015 | Osborne |
| 9,652,840 | B1* | 5/2017 | Shriver ................ H04W 4/021 |
| 9,875,430 | B1 | 1/2018 | Keisler et al. |
| 9,881,214 | B1* | 1/2018 | Zhong ................ G06K 9/00657 |
| 10,015,359 | B1 | 7/2018 | Kurzhanskiy et al. |
| 10,398,096 | B2* | 9/2019 | Hassanzadeh ....... G05B 19/042 |
| 10,438,302 | B2* | 10/2019 | Bedoya ................. G06Q 50/02 |
| 10,664,702 | B2* | 5/2020 | Albrecht ................ G06F 17/14 |
| 10,909,368 | B2* | 2/2021 | Guo ......................... G06T 7/174 |
| 10,996,656 | B2* | 5/2021 | Frieberg ............... A01B 79/005 |
| 2009/0094079 | A1 | 4/2009 | Linville |
| 2011/0320229 | A1 | 12/2011 | Stehling et al. |
| 2012/0109614 | A1 | 5/2012 | Lindores |
| 2013/0024411 | A1 | 1/2013 | Cai et al. |
| 2014/0056501 | A1 | 2/2014 | Du et al. |
| 2015/0015697 | A1* | 1/2015 | Redden ................ G06K 9/6202 348/89 |
| 2015/0022656 | A1 | 1/2015 | Carr et al. |
| 2015/0063709 | A1 | 3/2015 | Wang et al. |
| 2015/0193630 | A1 | 7/2015 | Von Kaenel et al. |
| 2016/0086034 | A1 | 3/2016 | Kennedy et al. |
| 2016/0157414 | A1 | 6/2016 | Ackerman et al. |
| 2016/0179841 | A1 | 6/2016 | Ford et al. |
| 2016/0224703 | A1* | 8/2016 | Shriver .............. G06Q 10/0631 |
| 2016/0239709 | A1* | 8/2016 | Shriver .............. G06K 9/00657 |
| 2016/0307073 | A1 | 10/2016 | Moody |
| 2017/0278248 | A1 | 9/2017 | Overbye |
| 2018/0132422 | A1 | 5/2018 | Hassanzadeh et al. |
| 2019/0050948 | A1 | 2/2019 | Perry et al. |
| 2019/0335674 | A1* | 11/2019 | Basso .................... G01N 21/00 |

OTHER PUBLICATIONS

Åstrand, B., & Baerveldt, A. J. (2002). An agricultural mobile robot with vision-based perception for mechanical weed control. Autonomous robots, 13(1), 21-35. (Year: 2002).*

Soria-Ruiz, Jesus, Yolanda Fernandez-Ordonez, Heather McNairm, and Joni Bugden-Storie. "Corn monitoring and crop yield using optical and RADARSAT-2 images." In 2007 IEEE International Geoscience and Remote Sensing Symposium, pp. 3655-3658. IEEE, 2007. (Year: 2007).*

Guan, Kaiyu, et al. "Mapping paddy rice area and yields over thai binh province in viet nam from modis, landsat, and alos-2/palsar-2." IEEE Journal of Selected Topics in Applied Earth Observations and Remote Sensing 11.7 (2018): 2238-2252. (Year: 2018).*

Teke, M., Deveci, H. S., Haliloğlu, O., Gürbüz, S. Z., & Sakarya, U. (Jun. 2013). A short survey of hyperspectral remote sensing applications in agriculture. In 2013 6th International Conference on Recent Advances in Space Technologies (RAST) (pp. 171-176). IEEE. (Year: 2013).*

Rahman, M., Di, L., Yu, E., Zhang, C., & Mohiuddin, H. (2019). In-season major crop-type identification for US cropland from landsat images using crop-rotation pattern and progressive data classification. Agriculture, 9(1), 17. (Year: 2019).*

Gallego, F. J., Kussul, N., Skakun, S., Kravchenko, O., Shelestov, A., & Kussul, O. (2014). Efficiency assessment of using satellite data for crop area estimation in Ukraine. International Journal of Applied Earth Observation and Geoinformation, 29, 22-30. (Year: 2014).*

Kastens, J. H., Kastens, T. L., Kastens, D. L., Price, K. P., Martinko, E. A., & Lee, R. Y. (2005). Image masking for crop yield forecasting using AVHRR NDVI time series imagery. Remote Sensing of Environment, 99(3), 341-356. (Year: 2005).*

Doraiswamy, Paul C., Sophie Moulin, Paul W. Cook, and Alan Stern. "Crop yield assessment from remote sensing." Photogrammetric engineering & remote sensing 69, No. 6 (2003): 665-674. (Year: 2003).*

Allen et al., "Economic Forecasting in Agriculture", International Journal of Forecasting. vol. 10(1). Feb. 1, 1994. pp. 81-135.

Badhwar, G.B., "Automatic Corn-Soybean Classification Using Landsat MSS Data. II. Early Season Crop Portion Estimation", Remote Sensing of Environment. vol. 14. Jan. 1, 1984. pp. 31-37.

Doraiswamy, et al., "Crop Classification in the U.S. Corn Belt Using MODIS Imagery", Geoscience and Remote Sensing Symposium, 2007. Jul. 23-28, 2007. pp. 809-812.

Feng, et al., "Weather Anomalies, Crop Yields, and Migration in the US Corn Belt", Available at http://www. columbia.edu/~ws2162/articles. Mar. 2015. pp. 1-64.

Anonymous, "Optimizing Crop Profit Across Multiple Grain Attributes and Stover", IP.com Prior Art Database Technical Disclosure. May 26, 2009. IP.com No: IPCOM000183536D. pp. 1-17.

Anonymous, "Sustainable Prediction Model for Farming", IP.com Prior Art Database Technical Disclosure. Oct. 31, 2013. IP.com No: IPCOM000232313D. pp. 1-11.

Anonymous, "System and Method for AgriPlanet—A Collaborative Portal Bringing Together Farmers, Agri Stakeholders and Philanthropist", IP.com Prior Art Database Technical Disclosure. Oct. 16, 2015. IP.com No: IPCOM000243783D. pp. 1-6.

Jakubauskas, et al., "Crop Identification Using Harmonic Analysis of Time-Series AVHRR NDVI Data", Computers and Electronics in Agriculture. vol. 37, Issues 1-3. Dec. 2002. pp. 127-139.

Pena-Barragan et al., "Object-Based Crop Identification Using Multiple Vegetation Indices, Textural Features and Crop Phenology", Remote Sensing of Environment. vol. 115, Issue 6. Jun. 15, 2011. Available at http:/www.sciencedirect.com/science/article/pii/S0034425711000290. pp. 1301-1316.

Reed et al., "Measuring Phenological Variability from Satellite Imagery", Journal of Vegetation Science. vol. 5, No. 5, Nov. 1994. Available at http://www.jstor.org/stable/i362436. pp. 703-714.

Sakamoto et al., "A Crop Phenology Detection Method Using Time-Series MODIS Data", Remote Sensing of Environment. vol. 96, Issues 3-4. Jun. 2005. Available at http://www.sciencedirect.com/science/article/pii/S0034425711000290 pp. 366-374.

Schmedtmann et al., "Reliable Crop Identification with Satellite Imagery in the Context of Common Agriculture Policy Subsidy Control", Remote Sensing. vol. 7, Issue 7. Jul. 22, 2015. Available at http://www.mdpi.com/2072-4292/7/7/9325 pp. 9325-9346.

Singh, "Digital Change Detection Techniques Using Remotely-Sensed Data", International Journal of Remote Sensing. vol. 10, Issue 6. Feb. 1988. pp. 989-1003.

Alemu, "Automated Farm Field Delineation and Crop Row Detection from Satellite Images", STARS Project.org MSc Theses. Feb. 2016. Available at http://www.stars-project.org/en/knowledgeportal/msc-theses/melkamu-meseret-alemu/. pp. 1-73.

Fais et al., "Airborne hyperspectral scanner and laser altimeter data application to water reservoirs and water use calculation: first results on two Italian case study", Proceedings of SPIE 5976—Repote Sensing for Agriculture Ecosystems, and Hydrology VII 59760. (Oct. 18, 2005); Available at http://dx.doi.org/10.1117/12.627787. pp. 1-12.

Nasa, "Potential benefits to be derived from applications of remote sensing of agricultural, forest, and ranger resources" NASA Technical Reports Server (NTRS) Dec. 1, 1967. Available at https://ntrs.nasa.gov/search.jsp?R=19690025552. pp. 1-170.

Meron et al., "Crop water stress mapping for site-specific irrigation by thermal imagery and artificial reference surfaces", Precision Agriculture. vol. 11, Issue 2. Apr. 2010. pp. 1-26.

(56) References Cited

OTHER PUBLICATIONS

Monmonier, "Aerial Photography at the Agricultural Adjustment Administration: Acreage Controls, Conservation Benefits, and Overhead Surveillance in the 1930s", Photogrammetric Engineering and Remote Sensing, vol. 68, No. 11. Dec. 2002, pp. 1257-1261.
Olfert et al., "Aerial photography for detection and assessment of grasshopper (*Orthoptera: Acrididae*) damage to small grain crops in Saskatchewan" The Canadian Entomologist. vol. 112, Issue 6. Jun. 1980. pp. 559-566. (Abstract only.).
Sahoo, "Use of Remote Sensing for Generation of Agricultural Statistics", Indian Agricultural Statistics Research Institute, New Delhi-10012. Feb. 2013. pp. 1-9.
Schurch et al., "Determining the foraging Potential of Oilseed Rape to Honey Bees Using Aerial Surveys and Simulations", Journal of Apicultural Research. Jul. 14, 2015. vol. 54, No. 3. Available at http://dx.doi. org/10.1080/00218839.2015.1108144. pp. 1-8.
Chacon, "Image Processing Using Time Matrix as a Selective Filter", Proceedings of 2003 International Conference on Image Processing, Sep. 2003, pp. 1-4.
U.S. Office Action issued in co-pending U.S. Appl. No. 15/395,748 dated Apr. 2, 2019, 14 pages.
U.S. Office Action issued in U.S. Appl. No. 15/395,748 dated Aug. 13, 2018, 14 pages.
U.S. Office Action issued in U.S. Appl. No. 15/395,748 dated Dec. 18, 2018, 14 pages.
Office Action for U.S. Appl. No. 15/395,748 dated Jun. 7, 2018.
U.S. Office Action issued in U.S. Appl. No. 16/540,814 dated Dec. 7, 2020, 46 pages.
U.S. Office Action issued in U.S. Appl. No. 16/119,371 dated Sep. 20, 2019, 41 pages.
List of IBM Patents or Patent Applications Treated as Related dated Aug. 14, 2019, 2 pages.
Mell, Peter, et al., "The NIST Definition of Cloud Computing," 2011, 7 pages.
List of IBM Patents or Patent Applications Treated as Related dated Sep. 16, 2019, 2 pages.
Gers, C., et al., "Using SPOT 4 satellite imagery to monitor area harvested by small scale sugarcane farmers at Umfolozi," Proc S Afr Sugarcane Technol Assoc, Aug. 2001, pp. 28-33, 75.
Notice of Allowance issued in U.S. Appl. No. 16/540,814 dated Jul. 2, 2021, 14 pages.
U.S. Office Action issued in U.S. Appl. No. 16/832,769 dated Jul. 9, 2021, 56 pages.

\* cited by examiner

500

```
┌─────────────────────────────────────────────────────┐
│ Obtain data (e.g., satellite data, remote sensing   │
│ measurements, weather data, historical data)        │
│ 502                                                 │
└─────────────────────────────────────────────────────┘
                          │
                          ▼
┌─────────────────────────────────────────────────────┐
│ Generate a set of vegetation indices                │
│ 504                                                 │
│  ┌───────────────────────────────────────────────┐  │
│  │ Apply smoothing function                      │  │
│  │ 506                                           │  │
│  └───────────────────────────────────────────────┘  │
└─────────────────────────────────────────────────────┘
                          │
                          ▼
┌─────────────────────────────────────────────────────┐
│ Convert timestamps (date-of-year) of vegetation     │
│ indices to a modified temporal variable correlated  │
│ with actual crop growth                             │
│ 508                                                 │
│  ┌───────────────────────────────────────────────┐  │
│  │ Set zero time point value for the modified    │  │
│  │ temporal variable using a threshold           │  │
│  │ vegetation index                              │  │
│  │ 510                                           │  │
│  └───────────────────────────────────────────────┘  │
└─────────────────────────────────────────────────────┘
                          │
                          ▼
┌─────────────────────────────────────────────────────┐
│ Train machine learning classifier                   │
│ 512                                                 │
│  ┌───────────────────────────────────────────────┐  │
│  │ Identify current season crop type             │  │
│  │ 514                                           │  │
│  └───────────────────────────────────────────────┘  │
└─────────────────────────────────────────────────────┘
                          │
                          ▼
┌─────────────────────────────────────────────────────┐
│ Estimate a crop acreage prediction value            │
│ 516                                                 │
└─────────────────────────────────────────────────────┘
```

FIG. 5

METHOD AND SYSTEM FOR CROP TYPE IDENTIFICATION USING SATELLITE OBSERVATION AND WEATHER DATA

BACKGROUND

Technical Field

The present invention generally relates to crop type identification, and more particularly, to crop type identification based on satellite observation and weather data.

Description of the Related Art

The United States Department of Agriculture (USDA) publishes crop acreage estimates, which include the acreages of different crop types that have been planted in a given county, crop district, state, and or the entire country. Reliable information about crop acreage, however, is typically available from the USDA only after the growing season has concluded. The estimates provide valuable insight into several factors for subsequent growing seasons, including estimated supply and demand of crop types for the following year. Farmers, for example, may utilize such estimates to determine efficient farm management plans at the earliest possible time, include what crop types to plant, how much acreage to dedicate to certain crop types, and what seeds and fertilizer to purchase.

The dominant approach towards early estimate crop acreage utilizes satellite remote sensing alone. Different crop types change color differently throughout their growth season. For example, corn fields typically turns green earlier than soybean fields in late spring. Using a set of satellite images captured during different dates of a growing season, one may observe how the color of each of the pixels on the satellite images varies over the growing season. Using the color variation, one may determine the pixel corresponding to what type of crop being planted to perform crop type identification. Then for a given county, crop district, state, or country, one may sum up the areas of all pixels corresponding to specific crop types to estimate the total acreage crop for the crops.

However, the current approach for crop type identification using satellite images by themselves is not very accurate. The main reason for the inaccuracy is that year-to-year variations in planting dates, as well as year-to-year variations in crop growth during the growing season, both related to variations in the yearly and local weather, makes the same type of crop grow at different rates. For example in one year, on a certain day of the year, the corn crop may already have reached the flowering stage, while in another year at the same day of the year, the corn crop is still two weeks away from the flowering stage. Consequently, the color variation of the same type of crop as a function of dates during the year, which is measured by satellite during the growth season, behaves differently in different years and at different locations. Thus, a crop type identification model may have difficulty in accurately differentiating crop types using satellite images alone.

SUMMARY

In accordance with an embodiment of the present invention, a computer-implemented method for crop type identification using satellite observation and weather data is provided. The method includes extracting current data and historical data from pixels of a plurality of satellite images of a target region, wherein the current data and the historical data includes a plurality of remote sensing measurements and weather data over a period of time, generating a set of temporal sequences of vegetation indices having corresponding timestamps from the plurality of remote sensing measurements, wherein each temporal sequence is associated with a respective pixel location within a satellite image and a crop season, based on the weather data, converting each timestamp of the temporal sequences into a modified temporal variable correlating with actual crop growth, training a classifier using a set of historical temporal sequences of vegetation indices with respect to the modified temporal variable as training features and corresponding historically known crop types as training labels, identifying at least one crop type for each pixel location within the satellite images using the trained classifier and the historical temporal sequences of vegetation indices with respect to the modified temporal variable for a current crop season, and estimating a crop acreage value by aggregating identified pixels associated with the at least one crop type.

In an embodiment of the present invention, a computer-implemented method for crop type identification using satellite observation and weather data is provided. The method includes extracting current data and historical data from pixels of a plurality of satellite images of a target region, wherein the current data and the historical data includes a plurality of remote sensing measurements and weather data over a period of time, generating a set of temporal sequences of vegetation indices having corresponding timestamps from the plurality of remote sensing measurements, wherein each temporal sequence is associated with a respective pixel location within a satellite image and a crop season, based on the weather data, converting each timestamp of the temporal sequences into a modified temporal variable correlating with actual crop growth, converting the vegetation indices of the temporal sequences into normalized vegetation indices, wherein each of the normalized vegetation indices are obtained by dividing a change in a vegetation index for a given period by a change in the modified temporal variable, training a classifier using a set of historical temporal sequences of normalized vegetation indices with respect to the modified temporal variable as training features and corresponding historically known crop types as training labels, identifying at least one crop type for each pixel location within the satellite images using the trained classifier and the historical temporal sequences of normalized vegetation indices with respect to the modified temporal variable for a current crop season, and estimating a crop acreage value by aggregating identified pixels associated with the at least one crop type.

In accordance with an embodiment of the present invention, a computer program product for crop type identification is provided. The computer program product includes a non-transitory computer readable storage medium having program instructions embodied therewith, the program instructions being executable by a computer to cause the computer to perform a method for crop acreage prediction, the method comprising extracting current data and historical data from pixels of a plurality of satellite images of a target region, wherein the current data and the historical data includes a plurality of remote sensing measurements and weather data over a period of time, generating a set of temporal sequences of vegetation indices having corresponding timestamps from the plurality of remote sensing measurements, wherein each temporal sequence is associated with a respective pixel location within a satellite image and a crop season, based on the weather data, converting each timestamp of the temporal sequences into a modified temporal variable correlating with actual crop growth, training a classifier using a set of historical temporal sequences of vegetation indices with respect to the modified temporal variable as training features and corresponding historically known crop types as training labels, identifying at least one crop type for each pixel location within the satellite images using the trained classifier and the historical temporal sequences of vegetation indices with respect to the modified temporal variable for a current crop season, and estimating a crop acreage value by aggregating identified pixels associated with the at least one crop type.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein:

FIG. 5 is a block/flow diagram showing a system/method for crop type identification in accordance with an embodiment of the present invention;

DETAILED DESCRIPTION

The present invention provides systems and methods for accurate crop type identification based on satellite observation (e.g., satellite imagery), weather data, and/or additional data relating to crop growth (such as soil information, irrigation, etc.) using machine learning. In some embodiments, the temporal axis of all satellite remote sensing measurements are reprojected onto a temporal variable that is more aligned with the actual crop growth compared to the calendar day-of-year. The temporal variable is determined using, for example, weather information. Thus, the satellite measured color variation of the same type of crop, as a function of the temporal variable in different years and locations, becomes more similar to each other, which simplifies the differentiation and identification of different crop types. In another embodiment, additional features beyond the satellite measure crop color variable are introduced to the machine learning based crop type classifier to improve accuracy of crop type identification.

Exemplary applications/uses to which the present invention can be applied include, but are not limited to: expected production of crops (e.g., yield) based on planted acreage, estimated geographic crop supply to reduce demand/supply imbalance, and/or farm management plan generation. Farm management plans help to support production management, such as meeting increased demands for a product, while reducing production costs. In other applications, crop type identifications can be employed to determine appropriate farm management plans, taking into account weather parameters.

Figure 1:
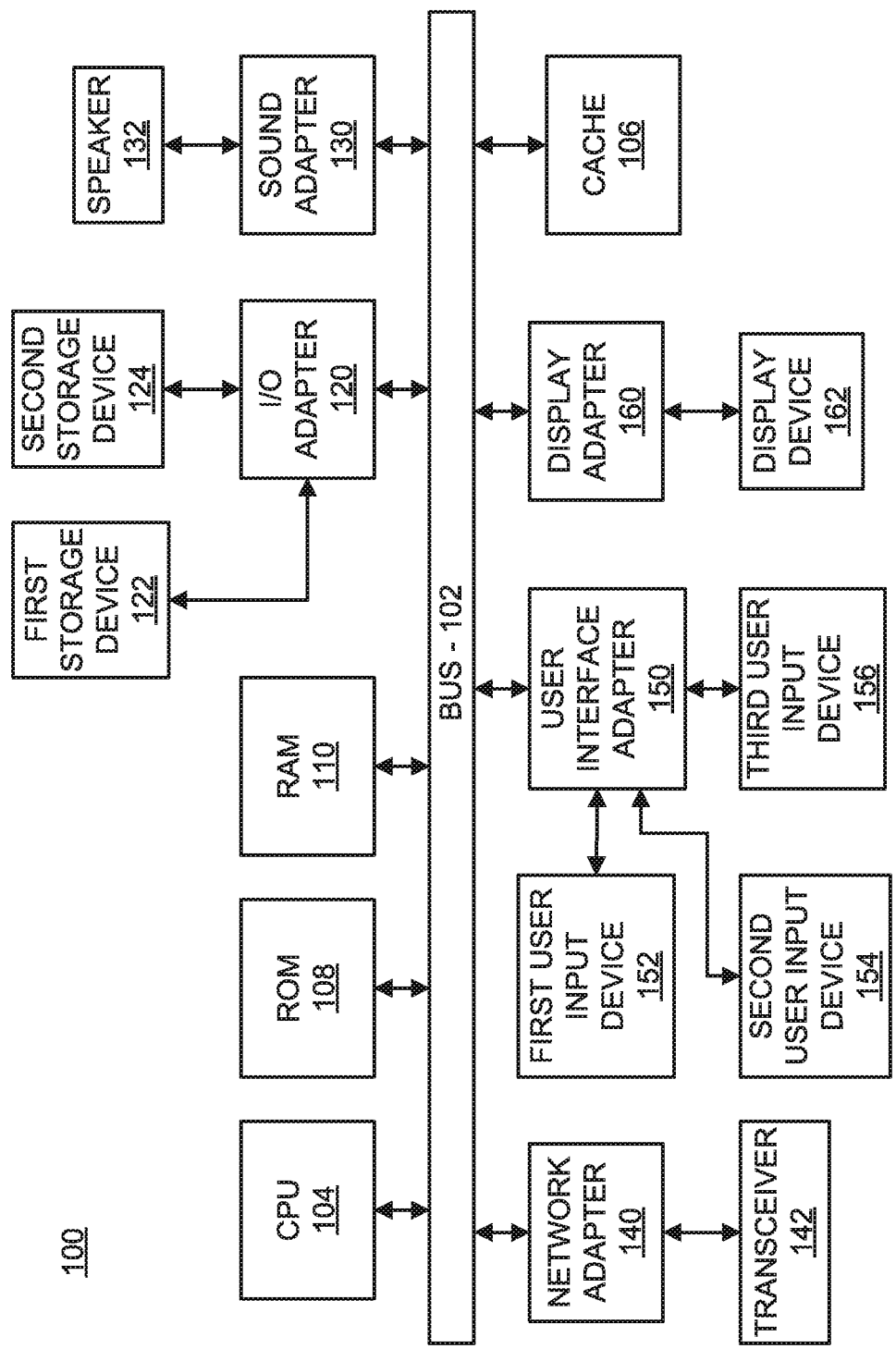
FIG. 1 shows an exemplary embodiment of a processing system to which the present invention may be applied.

Referring now to the drawings in which like numerals represent the same or similar elements and initially to FIG. 1, an exemplary processing system 100, to which the present invention may be applied, is shown in accordance with one embodiment. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 100.

The processing system 100 can also include other elements (not shown), as well as omit certain elements. For example, various other input devices and/or output devices can be included in processing system 100, depending upon the particular implementation of the same. For example, various types of wireless and/or wired input and/or output devices can be used. Moreover, additional processors, controllers, memories, and so forth, in various configurations can also be utilized. It is to be appreciated that the terms processors and controllers can be used interchangeably herein.

Figure 2:
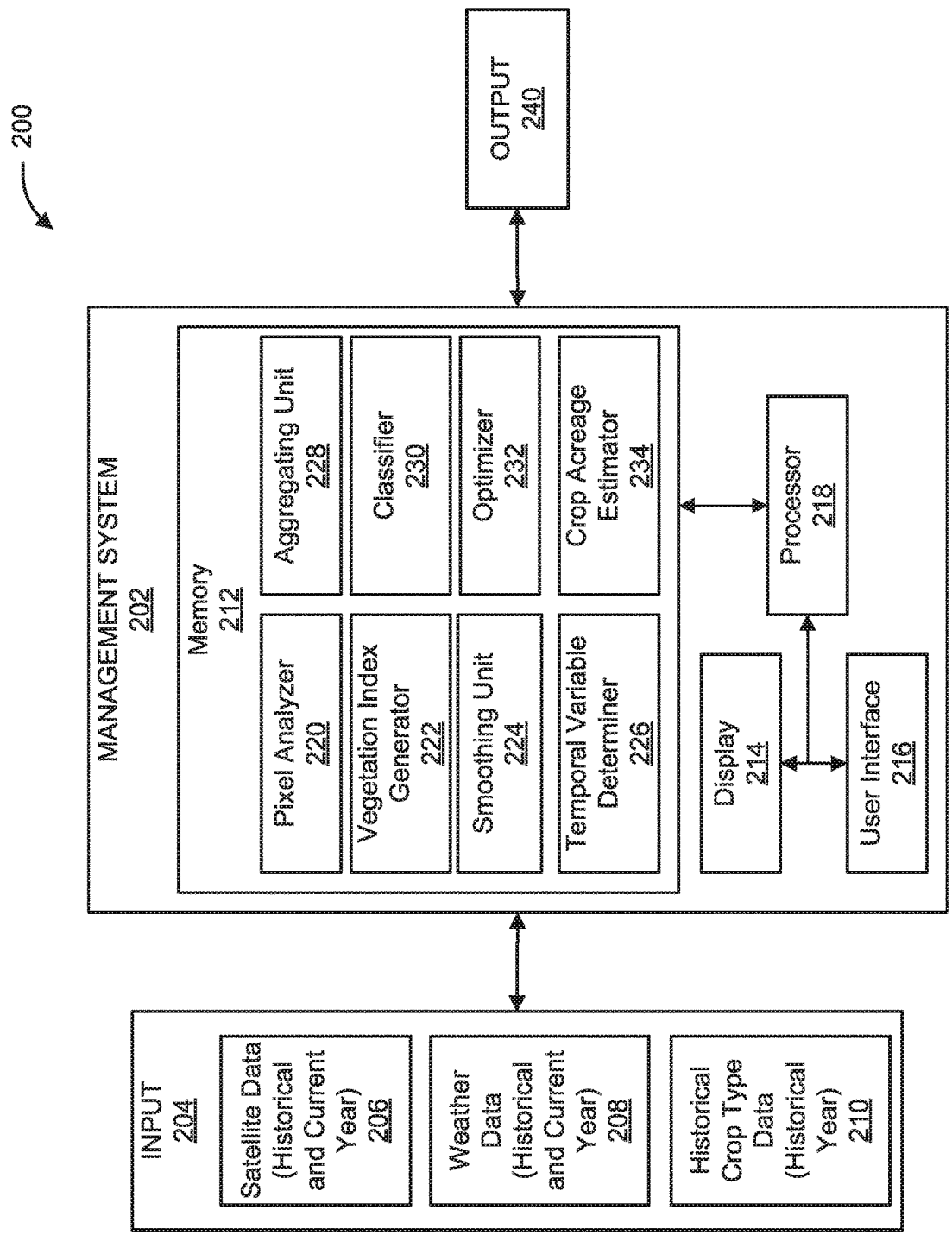
FIG. 2 depicts an exemplary system/method for crop acreage prediction in accordance with an embodiment of the present invention.

FIG. 2 represents a system 200 in accordance with an embodiment of the present invention with respect to an operational environment in which the present invention can be utilized. System 200 includes a management system 202 that includes one or more processors 218 and memory 212 for storing applications, modules and other data. In one embodiment, the memory unit 212 includes a large number of memory blocks, e.g., where calculations and data analysis may be performed. The system 200 can also include one or more displays 214 for viewing content. The display 214 permits a user to interact with the system and its components and functions. This may be facilitated by the inclusion of a user interface 216, which can include a mouse, joystick, or any other peripheral or control to permit user interaction with the system and/or its devices. It should be understood that the components and functions of the system 200 may be represented as one or more discrete systems or workstations, or may be integrated as part of a larger system or workstation.

Multispectral/multitemporal satellite imagery, in combination with machine learning, can be used to classify and/or identify crop type. However, year-to-year variations in planting dates, as well as year-to-year variations in crop growth during the season, both due to variations in the yearly and local weather, makes the same type of crop grow at different rates. For example, crops grow faster in a warm year than in a cool year. On a given day one year, the corn crop may already have reached the flowering stage, while on the same day in a subsequent year, the crop growth for corn is two weeks ahead or behind schedule from the flowering stage. Thus, the satellite measured color variation of the same type of crop during different growth seasons may behave differently, which makes it difficult to find robust features in the satellite data for machine learning that identifies crop types well for all types of years.

To deal with these challenges, changes in recorded intensities of satellite data between consecutive acquisition dates can be used as additional features for machine learning, which can be useful in dealing with offsets due to, for example, changes in planting dates and/or when comparing the same crop type growing in two different parts of the country. For example, a later planted crop may experience significantly warmer weather during its early growth, and therefore grow much faster. The same problem can arise due to year-on-year variations in the weather even if the crops are planted on the same day of a given year. Because crop growth depends on weather parameters rather than progress uniformly in time, the present invention employs weather data, in addition to the satellite imagery, to more accurately identify current season crop types.

In an embodiment, the system 200 obtains input 204, such as satellite data 206. The satellite data 206 includes images for a current year in which crop types are to be identified, as well as historical years in which crop types are known from, for instance, survey results from the USDA. Satellite data 206 includes one or more images having a plurality of pixels, wherein each pixel within each image stores information corresponding to land (e.g., farmland) at a specific location (e.g., defined by latitude and longitude) captured within that image. In some embodiments, the satellite data 206 includes a plurality of satellite images of a particular target area taken over a period of time (e.g., several crop growth seasons). In cases where individual satellite images do not share the same map projection (e.g., when the images are taken by the satellite at different look angles), the images can be reprojected and interpolated to the same common set of pixel locations.

Similarly, the weather data 208 includes weather parameters (e.g., temperature, accumulated precipitation, relative humidity, wind speed, solar radiance, and/or daily aggregation, etc.) for the current year as well as any historical year in which satellite data are available. The weather data 208 from the same pixel locations and time points as the satellite data 206 are obtained. Moreover, historical crop type data 210, e.g., for each historical year which crop types are planted for each of the satellite data pixel locations are obtained. It should be noted that identification of the crop type for current growing season is determined based on the satellite data 206, weather data 208 and historical data 210.

Each pixel within each satellite image of the satellite data 206 includes, for example, one or more spectral reflectance measurements for a given location and a given time point (e.g., timestamp). In some embodiments, a pixel analyzer 220 analyzes the pixels within the satellite image(s) to determine values for the spectral reflectance values measured for each pixel (corresponding to land at a specific location) within the images.

The spectral reflectance measurements include, for example, ratios of the reflected radiation over the incoming radiation in each spectral band individually, which can be represented by values between 0 and 1.0. Vegetation (e.g., plants) absorbs solar radiation in the visible spectral region and reflects solar radiation in the near-infrared spectral region, which can be measured/detected using spectral reflectance measurements. Accordingly, vegetated regions of different crop types reflect solar radiation differently, which can be employed to identify and/or distinguish varying crop types, as will be discussed in further detail below. Typically, vegetation can appear relatively bright in the near-infrared in satellite images. If there is much more reflected radiation in near-infrared wavelengths than in visible wavelengths, then the vegetation in that pixel is likely to be dense and may contain a specific type of vegetation. In contrast, non-vegetated areas tend to appear dark in the near-infrared.

Spectral reflectance measurements for one or more spectral bands of multispectral satellite images can be transformed into a vegetation index to enhance the spectral (color) signature of vegetation (e.g., the greenness, chlorophyll content, biomass, plant water content, etc.). In some embodiments, the vegetation indices include remote sensing measurements of single color bands and/or simple ratios of color bands (e.g., near infrared/red, near infrared/green, etc.). Generally, vegetation index measurements of a cropland can be regarded as a scientific characterization of the color of the crops, however the notion of color is not restricted to visible spectral range but also include near infrared.

Examples of vegetation indices include, but are not limited to, Normalized Difference Vegetation Index (NDVI) values, Enhanced Vegetation Index (EVI), Soil Adjusted Vegetation Index (SAVI), Modified Soil Adjusted Vegetation Index (MSAVI), Specific Leaf Area Vegetation Index (SLAVI), Normalized Difference Water Index (NDWI), Simple Ratio Vegetation Index (SR), etc. The data within such satellite images is used to calculate the vegetation indices. For instance, the NDVI value is a commonly used numerical indicator used to analyze remote sensing measurements to assess whether the target (e.g., land) includes live green vegetation. The NDVI can be measured using, for example, satellite remote sensors (e.g., an Advanced Very High Resolution Radiometer (AVHRR)).

In some embodiments, the vegetation index generator 222 generates a set of temporal sequences of vegetation indices (e.g., each vegetation index within the sequence corresponding to a timestamp which is ordered). Each sequence in the set includes vegetation indice(s) for one satellite pixel location and one crop growing season and one or more timestamps over a predetermined period of time within the season. For instance, the predetermined period of time may be from May to September for each growing season.

Vegetation indices can have varying signal strength throughout the growing season depending on the development of the crop. For example, crops can have (e.g., reflect)

lower NDVI values during early stages of development and higher NDVI values during later stages of development. Each individual vegetation index is associated with a corresponding timestamp (e.g., calendar day-of-year, time-of-day, etc.). For example, in a satellite image taken in the month of May, a pixel may have an NDVI value of 0.3 and in a satellite image taken in the month of June the same pixel may have a value of 0.5.

In an embodiment, a smoothing unit 224 can apply a smoothing function to reduce any noise in the satellite measured temporal sequence of vegetation indices. For example, a cloud mask can be applied, which removes, for a given pixel location, a data point (e.g., vegetation indices and timestamps) when the pixel location has cloud cover. The removed data point can be replaced by taking into account the values of vegetation indices for the same pixel location at earlier or later timestamps. In particular, a slowly-varying function, such as polynomial functions, smoothing spline functions, etc., can be fitted to each individual pixel's temporal sequence and the missing timestamps can be filled in by the fitting function's value at that timestamp. In addition, excessive noise in the images can be processed similarly. Instead of utilizing raw values (e.g., from satellite) of the vegetation index at each timestamp, the vegetation index values in a temporal sequence can be replaced by the fitting function values at the corresponding timestamps.

In an embodiment, the system 200 receives, as input 204, weather data 208 for each day during the period of time in which the satellite data 206 for the historical and current season are taken. For example, weather data 208 is obtained for each of the satellite pixel locations and each timestamp. Weather data 208 includes, but is not limited to, temperature, accumulated precipitation, relative humidity, wind speed, solar radiance, and/or daily aggregation of the same by using various functions, such as minimum, maximum, median, mean, and/or standard deviation determinations. In some embodiments, weather data 208 includes daily minimum and maximum temperatures.

In some embodiments, historical crop type data 210 is received as training labels for the classifier. Historical data 210 includes historical crop maps (e.g., cropscape) and/or the types of crops that were planted per satellite pixel location in previous years. The historical crop type data 210, together with the historical temporal sequences of satellite data 206 derived vegetation indices, as well as weather data 208, can be employed to train a classifier 230 to determine crop type for current seasons.

The use of weather data 208 in addition to the satellite data 206 for classification is useful for accurate crop classification for the following reasons. As noted early, the main reason for the inaccuracy of conventional crop type determination using satellite data alone is that the year-to-year variations in planting dates as well as year-to-year variations in crop growth during the growing season, both related to variations in the yearly and local weather, makes the same type of crop grow at different rates. Thus, even for the same type of crop, the temporal sequence of the vegetation indices in a growing season (e.g., the color of the crop changing as a function of timestamps) can be quite different from location to location and from year to year. For example, in one year, on a certain day of the year, the corn crop may already have reached the flowering stage, while in another year at the same day of the year, it is still two weeks away from the flowering stage. Thus, even though a corn field at the same day-of-year in two different years will have very different vegetation indices, as observed using satellite imagery, a crop type classifier may have classified the field as being two different crop types during these two years.

To counter such difficulty, the variation in crop growth due to weather conditions should be taken into account. Generally, crops grow in a cumulative, stepwise manner, strongly influenced by temperature and/or other weather parameters (e.g., solar irradiance, moisture, humidity, etc.). For example, crop development (e.g., growth) does not occur unless the temperature is above a minimum threshold value, such as a base temperature, depending on the particular crop type. In some instances, corn may grow during particular temperature parameters while soy may grow during different temperature parameters.

The temporal variable determiner 226 reprojects the temporal axis of temporal sequences of the vegetation indices onto a temporal variable different from the calendar day-of-year. For example, the temporal variable is aligned with actual crop growth, e.g., the temporal variable moves forward fast when the weather favors fast crop growth and vice versa. As one example, the temporal variable determiner 226 uses the aggregated growth degree unit (AGDU) as the new temporal variable for the temporal sequence of the vegetation indices. AGDU is defined as the accumulated value of growth degree unit (GDU, as defined below) experienced by a crop starting from a specific date in the growing season (e.g., planting date) to a current date. Growth degree units (GDUs) take into account local weather parameters, such as minimum and maximum daily temperatures and may be employed to predict a crops' pace toward maturity. In some embodiments, the temporal variable determiner 226 calculates GDUs for each day, dependent on daily minimum and maximum temperatures of the pixel locations stored in the weather data 208. Each pixel location may be categorized by its corresponding longitude and latitude, as well as timestamps (e.g., day-of-year, time-of-day, etc.). In an embodiment, each GDU can be defined as a mean temperature (e.g., the summation of the minimum and maximum temperature per day divided by two) minus the base temperature using the following equation:

$$GDU = \frac{T_{max} + T_{min}}{2} - T_{base},$$

where $T_{max}$ is the maximum daily temperature, $T_{min}$ is the minimum daily temperature, and $T_{base}$ is the base temperature needed in order for a particular crop to grow. For example, the base temperature needed for growth for a given crop may be a minimum of 10 degrees Celsius, while the maximum temperature may be capped at 30 degrees Celsius, since the selected crop generally does not grow well/faster above/below such temperatures. If the mean daily temperature $$\left(e.g., \frac{T_{max} + T_{min}}{2}\right)$$

is lower than the base temperature (e.g., $T_{base}$), then GDU is set to zero meaning that no growth of the crop will occur. As an example, corn may have a base temperature of 10 degrees Celsius and may take 800 to 1400 GDUs to grow to maturity. Beyond AGDU which accounts for temperature effects on crop growth, the temporal variable may also be chosen to account for the effect of other weather parameters, such as solar radiation precipitation etc., on crop growth.

While the temporal variable determiner 226 selects the temporal variable to align with crop growth, the potential difference in the crop planting date should be taken into account (e.g., when is zero for the temporal variable). An aggregating unit 228 selects a threshold value for a vegetation index and/or color bands (e.g., NDVI=0.5) where the temporal variable (e.g. AGDU) is set to zero. In some embodiments, the threshold value is an arbitrary value of a vegetation index (e.g., such as a NDVI value of 0.5). In an embodiment, the threshold value is a value in which there is strong plant growth and a high change in NDVI values between satellite images. In addition, the threshold value can be selected based on its ability to differentiate different crops. For example, high NDVI values may be associated only with particular crops while lower NDVI values are associated with other crop types.

Corresponding to the embodiment where AGDU is selected to be the temporal variable, ADGUs are conventionally GDUs accumulated from a planting date of a specific crop type. Instead of using the planting date of a particular crop as the point where AGDU is zero, an estimated timestamp (e.g., a date where the NDVI is 0.5, for example) is chosen where the AGDU is set at zero. Accordingly, dates before the estimated timestamp (e.g., when NDVI=0.5) associated with the selected threshold value will be associated with negative AGDUs and dates later than the estimated timestamp will be associated with positive AGDUs. Advantageously, there is no need to know the exact planting dates for each crop in each field, especially since planting dates are generally unknown and cannot be detected from satellite imagery. Since the planting dates of each crop may be different and/or difficult to identify from satellite data, the threshold value (e.g., selected NDVI value) may be used to ensure the temporal sequences of the satellite measured vegetation indices (e.g., temporal sequence with respect to the temporal variable, such as AGDU) at different pixel locations, for historical and current growing seasons, and are appropriately aligned using the same zero of the temporal axis.

In another embodiment, the aggregating unit 228 calculates aggregated grow degree units (AGDUs) from a timestamp when a vegetation index from the set of vegetation indices is equal to and/or exceeds the threshold value to provide a temporal variable. The temporal variable can include, for example, aggregated grow degree units (AGDUs). The temporal variable is associated with actual crop growth instead of uniform progress in time. For example, the aggregating unit 228 can determine the AGDUs by aggregating the GDUs from a timestamp when a historical vegetation index exceeds the selected vegetation index. In addition, the aggregating unit 228 aggregates the GDUs from a timestamp when a current vegetation index exceeds the selected threshold value.

In yet another example, the threshold value can include a maximum value of the vegetation index, such as the maximum value of NDVI that a particular crop type exhibits. Corn can exhibit NDVI values from 0 to 1, where values close to 0 indicate bare soil and values close to 1 are reached at the peak of the growing season, when the corn is the most vigorous. Later towards harvest, the NDVI values decrease due to drydown in the particular crop. Thus, selecting a threshold value for the vegetation indices about half way (e.g., 0.5) between the two extremes (e.g., 0 and 1) is advantageous to ensure that a positive slope in AGDUs is selected such that the values of the vegetation indices in spring/early summer are aligned, rather than values near harvest.

In other embodiments, the aggregating unit 228 uses a set of threshold values. The optimal threshold value is provided by the optimizer 232, as will be described in further detail below.

Figure 3:
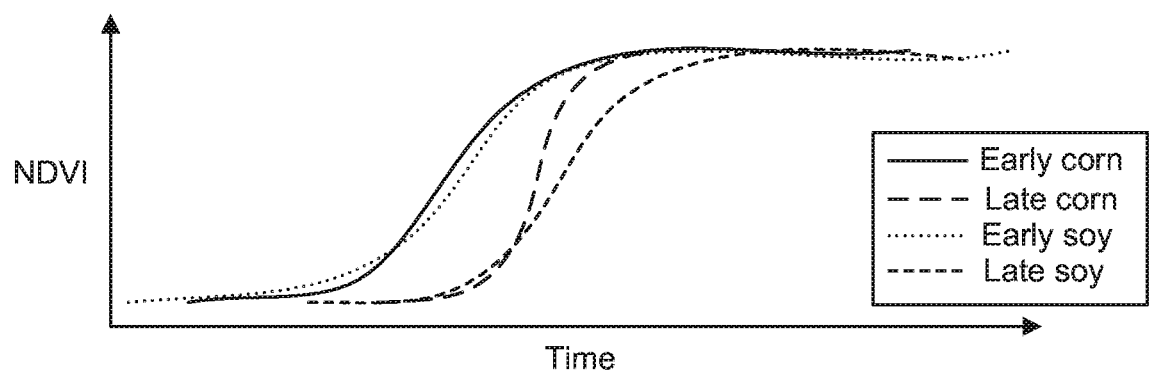
FIG. 3 depicts an exemplary temporal sequence of vegetation indices to identify crop type in accordance with conventional systems.

Crops exhibit varying vegetation index measurements depending on planting dates and/or weather parameters. For example, early planted corn/soy may exhibit higher vegetation index measurements than corn/soy planted at a later time, when conditions for growth may be different. Accordingly, varying weather parameters may play a role in plant growth and, thus, such vegetation index measurements. Conventional systems align such vegetation index measurements as a function of calendar day-of-year, which means comparing such vegetation index measurements at fixed dates and/or comparing the same crop at different growth stages, as will be further described with reference to FIG. 3. Accordingly, early corn/soy show increased NDVI values versus later planted corn/soy. However, as not all corn/soy is planted at the same time and each are subjected to different weather parameters, such conventional systems cannot differentiate effectively between two crops early in the growing season based on NDVI values alone.

Figure 4:
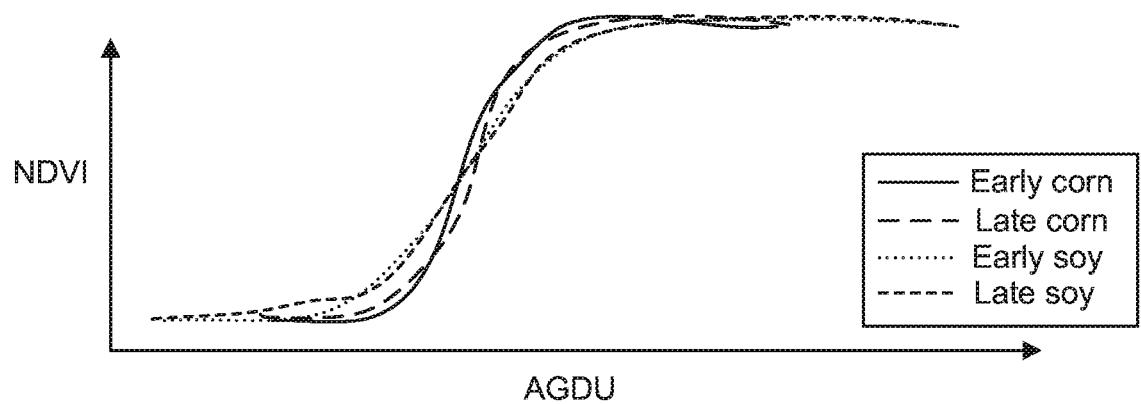
FIG. 4 depicts an exemplary temporal sequence of vegetation indices to identify crop type in accordance with an embodiment of the present invention.

In contrast, the present invention aligns vegetation index measurements with a temporal variable reflecting actual crop growth stages (such as AGDUs) instead of as a function of calendar day-of-year, as will be further described with reference to FIG. 4. In FIG. 4, the present invention aligns vegetation index measurements with actual crop growth based on a temporal variable, such as AGDUs, instead of as a function of time. For example, the timestamp of each of the temporal sequences can be converted into a modified temporal variable correlating with actual crop growth. The temporal sequence of vegetation index versus the temporal variable for early and late corn fields at different pixel locations, thus, will almost fall on a universal "corn" curve and the early and late planted soy will also fall on an almost universal "soy" curve. The universal corn and soy curves will be easier to differentiate using a machine learning classifier.

The classifier 230 classifies the crop type (e.g., corn versus soy) within a given satellite pixel location and a growing season using the temporal sequence of the satellite measured vegetation index versus the weather data adjusted temporal variable. FIG. 4 shows an illustrative comparison of such temporal sequences in which NDVI is chosen as the vegetation index and the AGDU is the temporal variable. The classifier 230 classifies the two corn sequences (curves) and the two soy sequences (curves) using machine learning.

A machine learning classifier is trained to identify the relationship between historical feature values and historical training labels. Such machine-learned relationships, referred to hereinafter as machine-learning models, between historical feature values and historical training labels can be "tested" using historical features and training labels that were not used in the training process. For example, every one out of ten years of historical data are held out (e.g., not used in the training process) to validate the performance of a machine-learnt relationship. In this way, the best machine-learning model may be chosen among multiple models being validated. Moreover, a machine-learning model trained using historical feature values and historical training labels can be applied to current or future features to predict what should be the corresponding labels. Known algorithms for training a machine learning model that may be used according to various embodiments include, for example, supervised learning, unsupervised learning, statistical classification, association rule learning, hierarchical clustering, partitional clustering, reinforcement learning, and deep learning. The machine learning model may be a neural network, linear model, generalized additive model, random forest (e.g., ensemble method) model, gradient boosted regression model, or supported vector machine model, for example. In addition, the machine learning algorithm may be a weighted average of two or more of the algorithms mentioned above.

In an embodiment, the classifier 230 is trained on historical data (e.g., a set of historical temporal sequences of vegetation indices with respect to the modified temporal variable as training features and corresponding historically known crop types as training labels). Temporal sequences of the satellite measured vegetation index versus the weather data adjusted temporal variable (hereinafter referred to as temporal sequence) from different pixel locations and historical growing seasons are used as training features. An illustrative example of a temporal sequence is, for example, NDVI value at AGDU=−200, −100, 0, 100, 200. The corresponding historical crop type data 210 are used as training labels.

In another embodiment, the training feature of the classifier 230 is the temporal sequences of normalized vegetation indices versus the temporal variable. The normalized vegetation is provided by dividing the change in the vegetation index (such as NDVI) for a given period by the change in the temporal variable (such as AGDUs). Note that the normalized value (e.g., $\Delta NDVI/\Delta AGDU$) describes the ratio of the change in NDVI value to the change in AGDU over a predetermined timespan, which correlates more closely with the growth habit of plants (e.g., putting on more biomass if the change in AGDU is higher) and, thus, may facilitate the classification.

In another embodiment, the training of the classifier 230 includes, beyond the temporal sequence, additional training features for the same pixel location as the temporal sequence. Such additional features may include environmental factors, which may affect plant growth and cause the vegetation index of the same crop type to differ. Environmental factors may include, for example, soil property, irrigation, elevation, elevation relative to the surrounding elevation, and soil wetness index. In addition, weather data may also be included as additional training features. Of value are the weather data impacting crop growth (e.g., expected to impact vegetation index values) but whose effects are not sufficiently accounted for when computing the temporal variable for the temporal sequence of vegetation indices using weather data (for example, the exemplary choice of AGDU as the temporal variable described above which only accounts for temperature effects on crop growth).

Such weather data includes, but is not limited to, pressure, growth degree unit, precipitation, relative humidity, wind speed, solar radiance, or aggregation of such factors over a time period using functions, such as minimum, maximum, median, mean, and/or standard deviation. For example, in the case of precipitation, daily precipitation data is very noisy and therefore difficult to use directly. However, aggregating the precipitation data over a period of time (e.g., such as two weeks) makes it less noisy. The minimum, maximum, mean, median, and/or standard deviation of precipitation during the two week window can be used as features to feed into the training of the classifier 230. For example, very low values of mean precipitation indicate drought, whereas very high values of standard deviation indicate strong downpours, etc.

The classifier 230, once trained using the training features (e.g., temporal sequences and optionally additional environmental factors and weather data) and labels (e.g., crop type) in the historical season, can be applied to the current season. By feeding the features of a given pixel location in the current season to the classifier 230, the classifier 230 identifies the crop type in the current season.

While a number of candidate methods (e.g., linear model classifier, support vector machine classifier, etc., as noted above) may be used to train a set of machine learning based classifiers, the optimal classifier can be selected by the optimizer 232. In one embodiment, the historical data 210 can be separated into years that serve the training and years that serve the testing. For example, every one out of ten years of historical data are withheld (e.g., not used in the training process) for testing the performance of the classifiers. For example, a classifier trained on the other nine years to identify the crop type can be used for each pixel location for the testing year and assess the result by comparing it to the actual crop type which is known. The best performing classifier can be selected in this way.

In yet another embodiment, the optimizer 232 can be used to search for an optimal threshold value for aggregating unit 228. A set of candidate threshold values of the vegetation index are selected (e.g., 0.3, 0.4, 0.5, 0.6, and 0.7 for NDVI). Each threshold value is used in the aggregating unit 228 for processing a set of temporal sequences of vegetation indices versus the temporal variable for the classifier 230. Each set of temporal sequences (corresponding to the threshold selected) is used to train a classifier which is then tested using the hold-out historical data. In this way, an optimized threshold value can be selected to process temporal sequences used as input for the classifier 230.

Using the temporal sequence as input, the crop type identified by the classifier 230 can be used by the crop acreage estimator 234 to determine an estimated crop acreage. In an embodiment, the crop acreage estimator 234 provides a crop acreage value, the crop acreage value being a prediction of an amount of acreage planted with the same crop type within a target region. Once the classifier 230 has identified the current season crop types for every pixel location on a map of the target region, the areas of all the pixels belonging to a certain crop type (e.g., corn) are cumulated resulting in the total corn acreage value. For example, the crop acreage value for corn can be determined by multiplying the number of pixels having the crop types and pixel resolution information (e.g., how many acreage of cropland each pixel corresponds to). The same is done for all other crops (e.g. soy, cotton, etc.).

The crop acreage value can be output 240 by the system 200 and/or be used in generating one or more farm management plans. For example, farmers can use this information to decide how much to invest in fertilizing. Most importantly, they can also sell their crop early on the futures market if they expect prices to drop due to a larger forecasted acreage, or they can refrain from doing so if the crop acreage forecasts are low and prices will therefore likely rise later on. The present invention advantageously provides a user a more accurate crop type identification and estimation of crop acreage based on satellite observation and weather data.

Referring to FIG. 5, an exemplary method 500 for crop type identification, in accordance with an embodiment of the present invention, is described. Part or all of method 500 may be performed by system 100 of FIG. 1 and system 200 of FIG. 2.

In block 502, the method 500 includes obtaining data. Data includes, for example, satellite data, weather data, historical crop maps, etc. In some embodiments, satellite data includes one or more satellite images of spectral reflectance measurements which can be used to compute vegetation index (such as NDVI). Each vegetation index may be associated with a satellite image pixel location and a respective timestamp (e.g., day-of-year, etc.). In further embodiments, weather data is obtained for the same pixel locations and timestamps as for the vegetation indices. The weather data includes but is not limited to, temperature (e.g., daily minimum and maximum temperatures), precipitation, relative humidity, wind speed, solar radiance, and/or aggregation of the same using various functions, such as minimum, maximum, median, mean, and/or standard deviation.

In block 504, a set of temporal sequences of vegetation indices from satellite spectral reflectance measurements is generated, such as NDVI values or other vegetation indices. The vegetation index is calculated directly from the spectral (color) bands of the satellite image pixel by pixel. The vegetation indices are organized into temporal sequences. One temporal sequence of vegetation indices with their associated timestamp (such as calendar day-of-year) per pixel location and crop growing season is obtained. In block 506, a smoothing function is applied to the temporal sequence of vegetation indices to reduce noise. For example, the smoothing function can remove extraneous and/or erroneous vegetation index measurements. The smoothing function filters out erroneous satellite pixels due to, for example, clouds, as well as other noise within the satellite images.

In block 508, each timestamp associated with a respective vegetation index in the temporal sequences is converted into a modified temporal variable that correlates with actual crop growth better than calendar day-of-year. An exemplary temporal variable is the aggregated growth degree unit (AGDU). The temporal variable moves forwards fast if the weather condition favors crop growth and vice versa. Optionally, in block 510, the time "zero" for the temporal variable is set using a threshold of the vegetation index. For example, the temporal variable may be set to "zero" when the satellite measured vegetation index (e.g., NDVI value) reaches an intermediate value (e.g., 0.5).

In block 512, a machine-learning classifier is trained on historical features and labels. Temporal sequences of the satellite measured vegetation index versus the temporal variable determined in blocks 508 and 510 from different pixel locations and historical growing seasons are used as training features. The corresponding crop type is used as training labels. Alternatively, the temporal sequence of normalized vegetation indices may be used as the training feature. Moreover, optionally, additional environmental factors and aggregated weather data can also be included as training features. Based on the learnt relationship between the features and the labels, the classifier identifies the current season crop type using current season's feature, as illustrated in block 514.

In block 516, the method 500 includes estimating a crop acreage prediction value by aggregating all the acreages of the individual pixels identified by the classifier as one crop.

While the present disclosure includes a detailed description on cloud computing, it should be understood that implementation of the subject matter described herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 6:
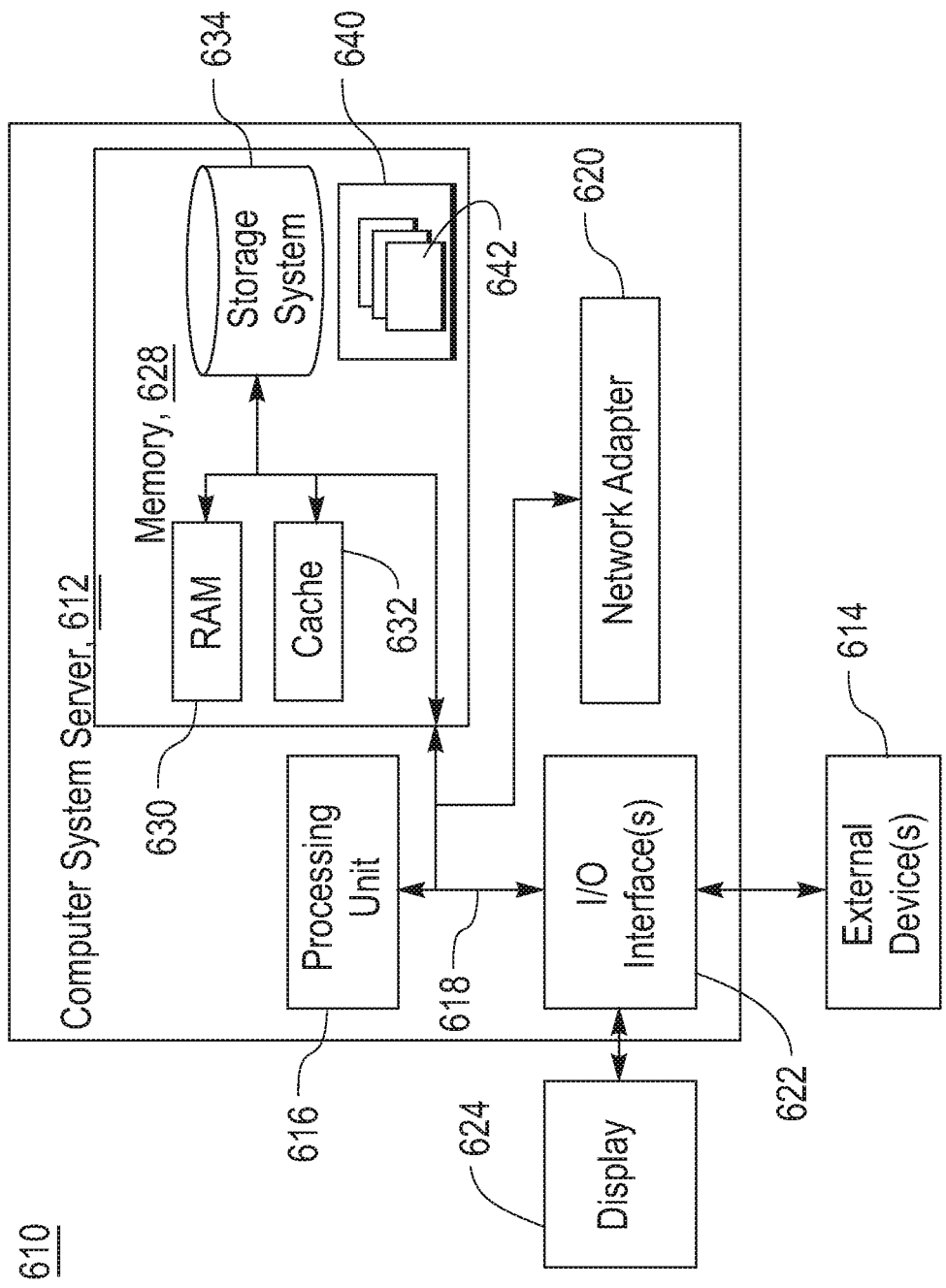
FIG. 6 shows an exemplary cloud computing node in accordance with an embodiment of the present invention.

Referring now to FIG. 6, a schematic of an example of a cloud computing node 610 is shown. Cloud computing node 610 is only one example of a suitable cloud computing node and is not intended to suggest any limitation as to the scope of use or functionality of embodiments of the invention described herein. Regardless, cloud computing node 610 is capable of being implemented and/or performing any of the functionality set forth hereinabove.

In cloud computing node 610 there is a computer system/server 612, which is operational with numerous other general purpose or special purpose computing system environments or configurations. Examples of well-known computing systems, environments, and/or configurations that may be suitable for use with computer system/server 612 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 612 may be described in the general context of computer system executable instructions, such as program modules, being executed by a computer system. Generally, program modules may include routines, programs, objects, components, logic, data structures, and so on that perform particular tasks or implement particular abstract data types. Computer system/server 612 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 612 in cloud computing node 610 is shown in the form of a general-purpose computing device. The components of computer system/server 612 may include, but are not limited to, one or more processors or processing units 616, a system memory 628, and a bus 618 that couples various system components including system memory 628 to processor 616.

Bus 618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 612 typically includes a variety of computer system readable media. Such media may be any available media that is accessible by computer system/server 612, and it includes both volatile and non-volatile media, removable and non-removable media.

System memory 628 can include computer system readable media in the form of volatile memory, such as random access memory (RAM) 630 and/or cache memory 632. Computer system/server 612 may further include other removable/non-removable, volatile/non-volatile computer system storage media. By way of example only, storage system 634 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 618 by one or more data media interfaces. As will be further depicted and described below, memory 628 may include at least one program product having a set (e.g., at least one) of program modules that are configured to carry out the functions of embodiments of the invention.

Program/utility 640, having a set (at least one) of program modules 642, may be stored in memory 628 by way of example, and not limitation, as well as an operating system, one or more application programs, other program modules, and program data. Each of the operating system, one or more application programs, other program modules, and program data or some combination thereof, may include an implementation of a networking environment. Program modules 642 generally carry out the functions and/or methodologies of embodiments of the invention as described herein.

Computer system/server 612 may also communicate with one or more external devices 614 such as a keyboard, a pointing device, a display 624, etc.; one or more devices that enable a user to interact with computer system/server 612; and/or any devices (e.g., network card, modem, etc.) that enable computer system/server 612 to communicate with one or more other computing devices. Such communication can occur via Input/Output (I/O) interfaces 622. Still yet, computer system/server 612 can communicate with one or more networks such as a local area network (LAN), a general wide area network (WAN), and/or a public network (e.g., the Internet) via network adapter 620. As depicted, network adapter 620 communicates with the other components of computer system/server 612 via bus 618. It should be understood that although not shown, other hardware and/or software components could be used in conjunction with computer system/server 612. Examples include, but are not limited to: microcode, device drivers, redundant processing units, external disk drive arrays, RAID systems, tape drives, and data archival storage systems, etc.

Figure 7:
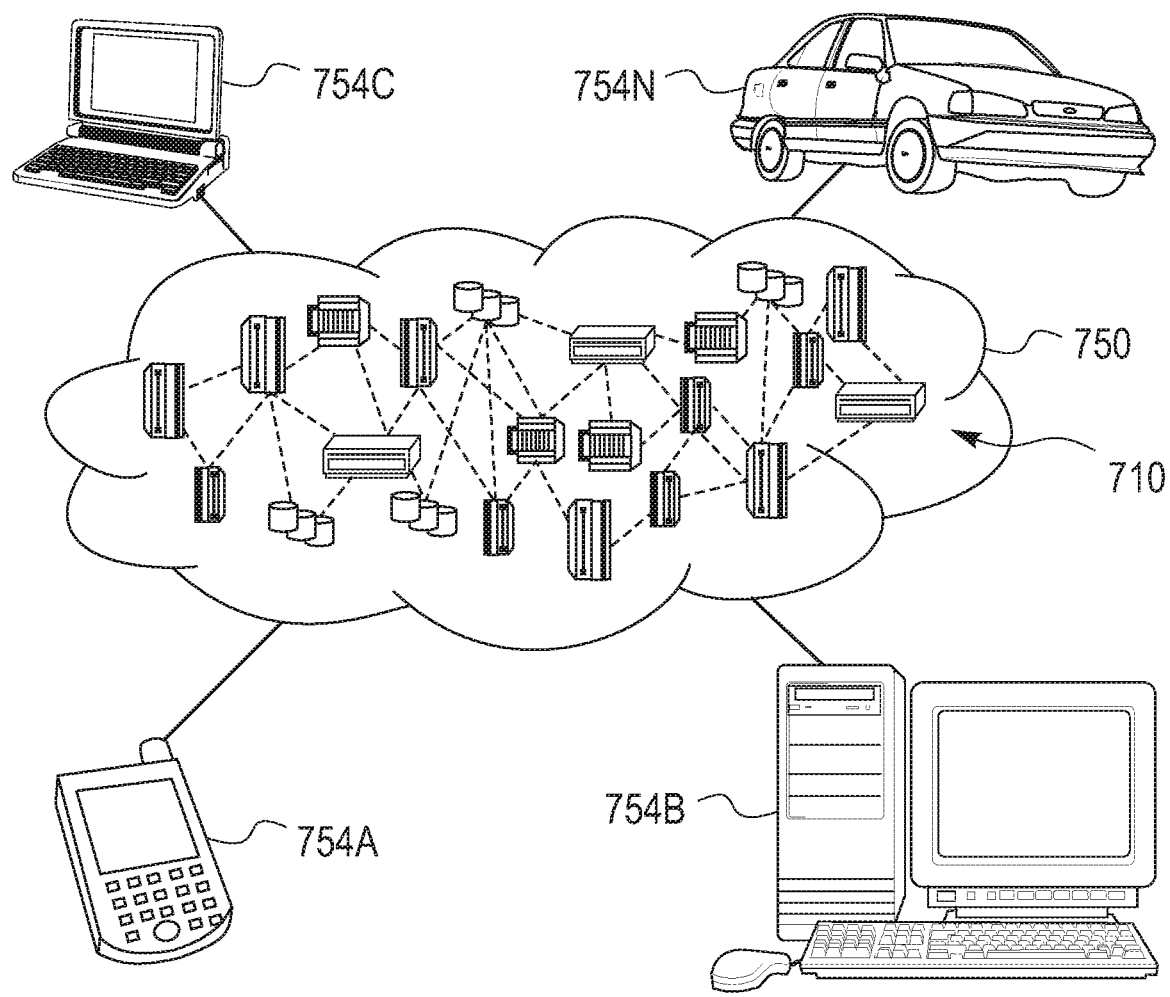
FIG. 7 shows an exemplary cloud computing environment in accordance with an embodiment of the present invention.

Referring now to FIG. 7, illustrative cloud computing environment 750 is depicted. As shown, cloud computing environment 750 comprises one or more cloud computing nodes 710 with which local computing devices used by cloud consumers, such as, for example, personal digital assistant (PDA) or cellular telephone 754A, desktop computer 754B, laptop computer 754C, and/or automobile computer system 754N may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 7 are intended to be illustrative only and that computing nodes 710 and cloud computing environment 750 can communicate with any type of computerized device over any type of network and/or network addressable connection (e.g., using a web browser).

Figure 8:
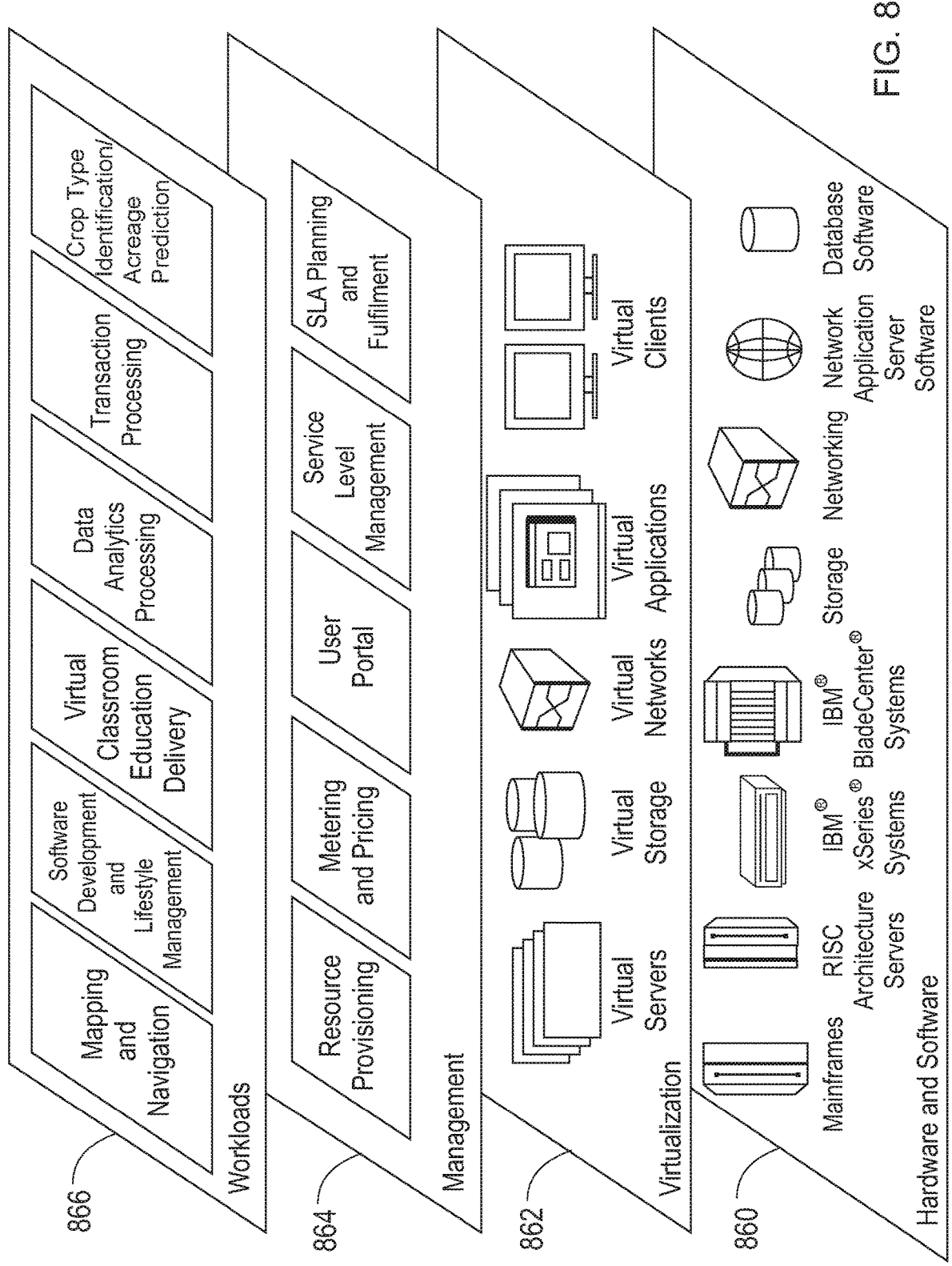
FIG. 8 shows exemplary abstraction model layers, in accordance with an embodiment of the present invention.

FIG. 8 shows a set of functional abstraction layers provided by cloud computing environment 750. It should be understood in advance that the components, layers, and functions shown in FIG. 8 are intended to be illustrative only and embodiments of the invention are not limited thereto. As depicted, the following layers and corresponding functions are provided:

Hardware and software layer 860 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 862 provides an abstraction layer from which the following examples of virtual entities may be provided: virtual servers; virtual storage; virtual networks, including virtual private networks; virtual applications and operating systems; and virtual clients.

In one example, management layer 864 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 866 provides examples of functionality for which the cloud computing environment may be utilized. Examples of workloads and functions which may be provided from this layer include: mapping and navigation; software development and lifecycle management; virtual classroom education delivery; data analytics processing; transaction processing; and crop type identification and acreage prediction.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method for crop acreage prediction using satellite observation and weather data (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for crop type identification using satellite observation and weather data, comprising:
generating a set of temporal sequences of vegetation indices having corresponding timestamps from a plurality of remote sensing measurements, the vegetation indices being based on vegetation color associated with a crop growth cycle, each temporal sequence being associated with a respective pixel location within a satellite image and a crop season;
converting each timestamp of the temporal sequences into a modified temporal variable correlating with actual crop growth; and
identifying at least one crop type for each pixel location within the satellite images using a trained classifier and historical temporal sequences of vegetation indices with respect to the modified temporal variable for a current crop season and a yield for the at least one crop type based on a farm management plan.

2. The method of claim 1, further comprising applying a smoothing function to the set of temporal sequences of vegetation indices to reduce noise.

3. The method of claim 1, wherein the remote sensing measurements include single color bands, ratios of two color bands, or a normalized vegetation index.

4. The method of claim 1, wherein the modified temporal variable includes aggregated grow degree units (AGDUs).

5. The method of claim 4, further comprising setting a zero setting time point for the modified temporal variable using a threshold value of a vegetation index, wherein setting the zero value further comprises:
- selecting the threshold value for the vegetation index;
- setting the temporal variable to be zero at a time point where a satellite measured vegetation index exceeds the threshold value; and
- computing values of the modified temporal variable at other time points with respect to the zero setting time point.

6. The method of claim 5, further comprising selecting an optimal threshold value from a set of potential values by testing held-out historical data.

7. The method of claim 1, wherein the trained classifier includes a linear classifier, a support vector machine classifier, a random forest classifier, a neural network classifier, a support vector machine classifier or a combination thereof.

8. The method of claim 1, further comprising selecting an optimal classifier from a set of classifiers by testing held-out historical data.

9. The method of claim 1, wherein training features of the classifier include temporal sequences of normalized vegetation indices.

10. The method of claim 1, wherein training features of the classifier include environmental factors selected from the group consisting of soil property, irrigation, elevation, elevation relative to the surrounding elevation, and soil wetness index.

11. The method of claim 1, wherein training features of the classifier include weather factors selected from the group consisting of pressure, growth degree unit, precipitation, relative humidity, wind speed, solar radiance, and aggregation of the weather factors over a time period.

12. A computer-implemented method for crop type identification using satellite observation and weather data, comprising:
- generating a set of temporal sequences of vegetation indices having corresponding timestamps from a plurality of remote sensing measurements, the vegetation indices being based on vegetation color associated with a crop growth cycle, wherein each temporal sequence is associated with a respective pixel location within a satellite image and a crop season;
- converting each timestamp of the temporal sequences into a modified temporal variable correlating with actual crop growth;
- converting the vegetation indices of the temporal sequences into normalized vegetation indices, wherein each of the normalized vegetation indices are obtained by dividing a change in a vegetation index for a given period by a change in the modified temporal variable; and
- identifying at least one crop type for each pixel location within the satellite images using a trained classifier and historical temporal sequences of normalized vegetation indices with respect to the modified temporal variable for a current crop season and a yield for the at least one crop type based on a farm management plan.

13. The method of claim 12, further comprising applying a smoothing function to the set of temporal sequences of vegetation indices to reduce noise.

14. The method of claim 12, wherein the remote sensing measurements include single color bands, ratios of two color bands, or a normalized vegetation index.

15. The method of claim 12, wherein the modified temporal variable includes aggregated grow degree units (AGDUs).

16. A computer program product for crop type identification using satellite observation and weather data, the computer program product comprising a non-transitory computer readable storage medium having program instructions embodied therewith, the program instructions being executable by a computer to cause the computer to perform a method comprising:
- generating a set of temporal sequences of vegetation indices having corresponding timestamps from a plurality of remote sensing measurements, the vegetation indices being based on vegetation color associated with a crop growth cycle, wherein each temporal sequence is associated with a respective pixel location within a satellite image and a crop season;
- converting each timestamp of the temporal sequences into a modified temporal variable correlating with actual crop growth; and
- identifying at least one crop type for each pixel location within the satellite images using a trained classifier and historical temporal sequences of vegetation indices with respect to the modified temporal variable for a current crop season and a yield for the at least one crop type based on a farm management plan.

17. The computer program product of claim 16, wherein the method further comprises applying a smoothing function to the set of temporal sequences of vegetation indices to reduce noise.

18. The computer program product of claim 16, wherein the remote sensing measurements include single color bands, ratios of two color bands, or a normalized vegetation index.

19. The computer program product of claim 16, wherein the modified temporal variable includes aggregated grow degree units (AGDUs).

20. The computer program product of claim 16, wherein training features of the classifier include temporal sequences of normalized vegetation indices.

* * * * *